United States Patent Office 3,814,664
Patented June 4, 1974

3,814,664
GASEOUS REACTION APPARATUS INCLUDING A PERIPHERAL GAS RECEIVING CHAMBER
Lawrence A. Carlsmith, Amherst, N.H., assignor to Improved Machinery Inc., Nashua, N.H.
Filed Sept. 11, 1972, Ser. No. 288,031
Int. Cl. D21c 7/00, 9/10
U.S. Cl. 162—236
10 Claims

ABSTRACT OF THE DISCLOSURE

Gaseous reaction apparatus including a generally vertical vessel, a conduit for supplying gas to the upper end of the vessel, a conduit for causing material to be blown into the upper end of the vessel by gas discharged from the latter, and an outlet for discharging material from the lower end of the vessel. A gas receiving chamber peripherally of the vessel is open to the vessel intermediate the ends of the latter for receiving a carrier or other gas from a gas-material mixture in the vessel, and an outlet is provided for discharging gas from the gas receiving chamber. One use for this gaseous reaction apparatus is in the gaseous bleaching of pulp.

---

The present invention relates to apparatus for the gasous reaction of material such as a solid or solid-liquid mixture.

During some gaseous reaction processes, it is necessary to discharge or exhaust a large volume of carrier or other gas from the reaction vessel separately from the reacted solid or solid-liquid mixture. For example, as it is impossible to generate pure ozone due to its chemical instability, during the ozone gaseous bleaching of pulp the ozone must be supplied as a relatively small portion of a mixture of ozone and oxygen carrier gas, such mixture perhaps including only four percent ozone while containing ninety-six percent oxygen. The large oxygen component of this mixture is not consumed during the bleaching process and, hence, must be discharged from the reaction vessel separately from the bleached pulp. Similarly, during the gaseous bleaching of pulp by chlorine dioxide in mixture with nitrogen or other inert gas, a large volume of the nitrogen or other inert gas must be discharged from the reaction vessel separately from the bleached pulp.

An object of the present invention is to provide new and improved gaseous reaction apparatus which is particularly constructed and arranged to permit gas to be discharged from a vessel separately from the discharged material.

Another object of the invention is to provide new and improved gaseous reaction apparatus of the type set forth which is particularly constructed and arranged to permit continuous discharge of large volumes of the gas.

Another object is to provide new and improved gaseous reaction apparatus of the type set forth which is particularly constructed and arranged to permit discharge of the gas without the necessity for screens or similar filtering surfaces susceptible to plugging by the material.

Another object is to provide new and improved gaseous reaction apparatus which is particularly constructed and arranged whereby material is blown into a vessel.

Another object of the invention is to provide new and improved gaseous reaction apparatus which is particularly constructed and arranged whereby material in disintegrated condition is blown into a vessel by gas discharged from the vessel.

Another object is to provide new and improved gaseous reaction apparatus of the type set forth which, although particularly suited for employment in a pulp bleaching process, is alternatively capable of use in the gaseous reaction of other solid-liquid and solid material.

Other objects and advantageous of the invention will be apparent from the following description taken in connection with the accompanying drawings wherein, as will be understood, the preferred embodiment of the invention has been given by way of illustration only.

In accordance with the invention, an apparatus for the gaseous reaction of material, generally considered, may comprise a vessel, supply means connected to one end of the vessel for supplying material and gas to such one end of the vessel, discharge means connected to the other end of the vessel for discharging material from such other end of the vessel, means incorporated with the vessel providing a gas receiving chamber open to the vessel substantially spaced intermediate said connections of the supply means and the material discharge means for upwardly receiving gas from a gas-material mixture in the vessel separately from the material in the mixture, and means for discharging gas from the gas receiving chamber. Also, in accordance with the invention, the material supply means may comprise means for compacting material and means for disintegrating the compacted material and causing the disintegrated material to be blown into the vessel.

Referring to the drawings.

Figure 1:
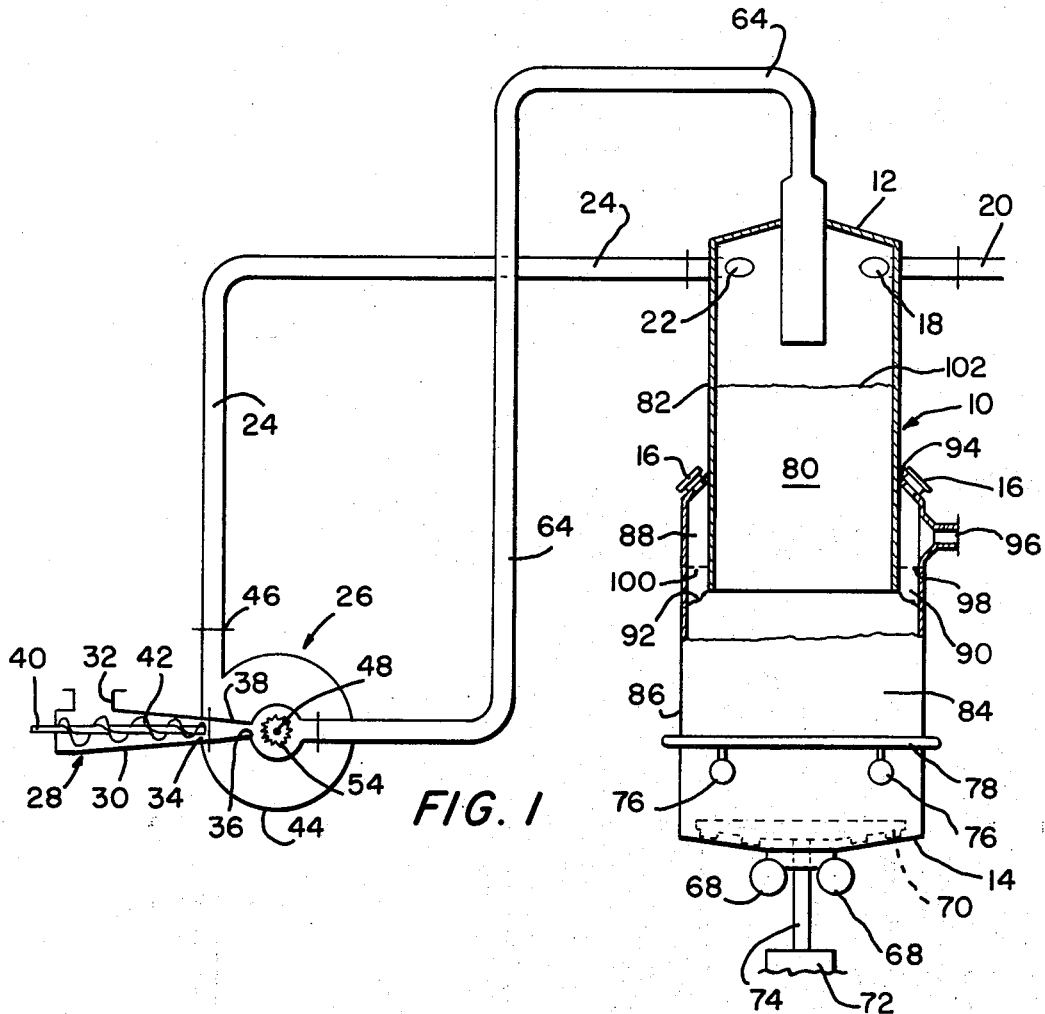
FIG. 1 is a view schematically depicting an apparatus constructed in accordance with one embodiment of the present invention.
Figure 3:
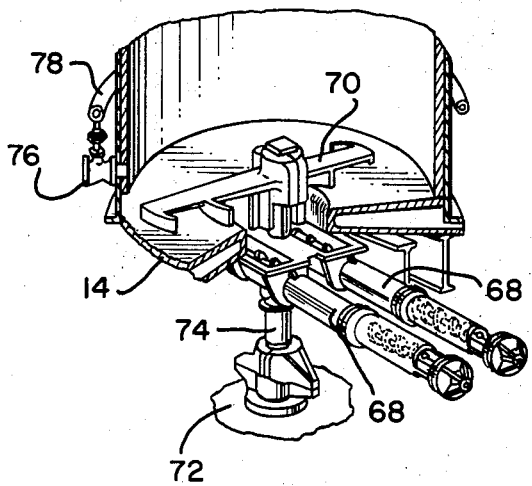
FIG. 3 is an enlarged elevational view, partially broken away and in section, of the lower end of the vessel included in such apparatus.

Referring more particularly to the drawings wherein similar reference characters designate corresponding parts throughout the several views, the illustrated apparatus comprises a generally vertical or upright, annular, reaction vessel, designated generally as 10, which is closed at its upper and lower ends by end closure plates 12, 14, respectively, and provided with the usual, normally closed, clean-out ports 16. The vessel 10, if desired or required by the gaseous reaction process to be carried by the apparatus, may be designed for operation at atmospheric pressure or at any other pressure above or below atmospheric pressure; however, in any event the vessel 10 is gas-tight to prevent gas leakage into and out of the vessel 10.

The vessel 10 is provided with at least one gas inlet or inlet conduit 18 connected to the upper end of the vessel interior and communicating the latter through a gas supply conduit 20 with a source (not shown) of the gas or gaseous reagent to be employed during the operation of the apparatus. The vessel 10 is also provided with a material inlet or inlet conduit 22 connected to the upper end of the vessel interior and communicating the latter through a material supply conduit 24 with a material disintegrating-and-blowing means designated generally as 26. The disintegrating-and-blowing means 26 is, in turn, connected through a feed-and-compacting means, designated generally as 28, to a source of the material to be reacted with the gas.

The feed-and-compacting means 28 includes a housing 30 having an inlet 32, adapted to receive material from the source thereof, and an outlet 34 connected to the inlet 36 of the hereinafter described disintegrating-and-blowing means 26 through a conduit 38. The housing 30 and the conduit 38, as shown in FIG. 1, both taper or progressively narrow in cross-section in the direction of the passage of the material towards the vessel 10 therethrough. A rotatably driven shaft 40 is coaxially disposed in the housing 30 and therein carries a feed-and-compacting screw 42 which is continuously rotatably driven throughout the operation of the apparatus. Hence, throughout such operation, the screw 42 compacts the material in the tapering conduit 38 whereby the compacted material forms a plug upstream of the vessel inlet 22 to prevent air and other undesirable gases from being introduced into the vessel 10 with the material.

Figure 2:
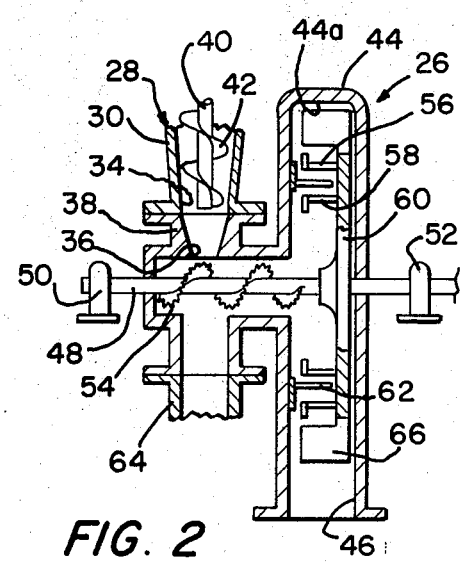
FIG. 2 is an enlarged, elevational, sectional view of a portion of the apparatus shown in FIG. 1.

The disintegrating-and-blowing means 26 is particularly adapted for disintegrating the compacted material received from the tapering conduit 38, then further breaking-up and fluffing such compacted material and finally causing the material to be blown into the vessel 10. The disintegrating-and-blowing means 26 comprises a housing 44 which, as shown in FIG. 2, includes the inlet 36 connected to the tapering conduit 38 and a tangential outlet 46 connected to the supply conduit 24. A rotatably driven shaft 48, supported by bearings designated generally as 50, 52, is coaxially disposed in the housing 44 and carries a serrated, disintegrating screw 54 adapted to disintegrate the material plug and feed the disintegrated material into an enlarged portion 44a of the housing 44. The housing enlarged portion 44a contains radially spaced, inner and outer annuli or rings of arcuately spaced apart, rotary pins 56, 58, mounted by a frame 60 on the shaft 48 for rotation therewith, and a therebetween annulus or ring of arcuately spaced apart, stationary pins 62 which are mounted on the housing 44. During the operation of the disintegrating-and-blowing means 26, the rotary pins 56, 58 are continuously rotatably driven by the rotation of the shaft 48 and the material is broken up or fluffed by such pins and passes radially outwardly through the spaces between adjacent ones of the pins 56, 58, 62 to the housing outlet 46.

The housing 44 communicates through a circulating gas conduit 64 with the upper end of the vessel interior to receive gas from the vessel upper end, whereby such gas conveys the material discharged from the housing 44 upwardly through the material supply conduit 24 to the material inlet 22. Also, the frame 60 at its outer ends carries blower or fan blades 66 serving to provide gas blowing capacity additional to that provided by the rotary pins 56, 58. The fan vanes 66, as will be understood, are suitably dimensioned to create a material-gas velocity sufficient to convey a material-gas mixture through the conduit 24 and inlet 22 into the vessel upper end.

The lower end of the vessel 10 is provided with discharge means for discharging material from the vessel 10, such discharge means being illustrated as comprising a plurality of outlet or outlet conduits 68 connected to the vessel lower end, a scraper 70 in the vessel lower end adjacent to the outlets 68 adapted to be rotatably driven by a driving motor 72 through a driving shaft 74, a plurality of dilution supply conduits 76 connected to supply dilution liquid to the lower end of the vessel at locations arcuately spaced therearound, and a header 78 communicating the dilution supply conduits 76 with a pressurized source (not shown) of suitable dilution liquid. Alternatively, however, as will be understood, the discharge means of the apparatus could be of other suitable construction.

The illustrated apparatus further comprises means incorporated with the vessel 10 providing the vessel 10 with an annular, peripheral gas receiving chamber arranged to continuously upwardly receive a large volume of gas from a gas-material mixture in the vessel 10 separately from the material in the mixture, and means for discharging gas from the upper end of the gas receiving chamber. This gas receiving chamber, as shown in the drawing, is open to the vessel interior 10 substantially spaced intermediate the upper and lower ends thereof and at a location substantially spaced longitudinally of the vessel 10 between the connections of the inlets 18, 22 and the connection of the material discharge outlets 68 thereto.

More particularly, as illustrated, the interior of the vessel 10 is formed to include an upper portion 80 peripherally bounded by a generally vertical, annular wall 82 and a therebelow adjoining lower portion 84 peripherally enclosed within a generally vertical, annular wall 86. The upper portion 80 of the vessel interior is, moreover, throughout its length formed of horizontal cross-section or cross-sectional area substantially less than that of the communicating, lower portion 84 of the vessel interior. The annular wall 86 is upwardly extended to coaxially project circumferentially around the lower end of the annular wall 82 radially spaced therefrom by the relatively large cross-section, vertically elongated annular gas receiving chamber 88 which extends peripherally around the vessel upper portion 80 and throughout its length is closed by the wall 82 from direct connection thereto. The annular, lower end 90 of the gas receiving chamber 88 surrounds the lower end of the vessel upper portion 80 and is entirely open to the upper end of the vessel lower portion 84 to serve as a large, unrestricted, annular, opening through which, during the operation of the apparatus, gas continuously upwardly passes. Hence, during such operation the cross-section of the mass or plug of downwardly moving material in the vessel expands adjacent the connection of the vessel upper and lower portions 80, 84 to form an annular gas-material interface designated generally as 92; and carrier gas or other excess gas flows through such interface 92 upwardly into the gas receiving chamber 88. Moreover, in the event that the velocity of the gas flowing upwardly through the interface 92 is maintained sufficiently low, no material will be entrained with the upwardly moving gas; and, hence, material will not be discharged through the gas receiving chamber 88 even though no screen or other filtering surface be employed. For example, when the apparatus was employed for the bleaching of pulp, such material loss has been avoided by the maintenance of the gas flowing through the interface 80 at a velocity below two feet per second and preferably in the range of one-half to one foot per second.

The upper end of the gas receiving chamber 88 is closed by an annular closure wall 94 which interconnects the annular walls 82, 86 and is provided with the clean-out openings 16; and immediately below the closure wall 94 a gas discharge outlet or outlet conduit 96 is connected to the upper end of the gas receiving chamber 88 for discharging gas from the latter. The gas receiving chamber 88, as illustrated, intermediate its upper and lower ends contains a generally horizontal annular, manifold plate 98 having equally spaced openings 100 therethrough, serving to pass gas at a relatively small pressure drop, thereby causing gas to discharge uniformly throughout the arcuate extent of the chamber 88 and avoiding the possibility of concentrated gas flow through the portion of the chamber 88 nearest to this connection of the outlet 96.

In accordance with the invention, and for the purposes of specific example, in a pulp bleaching embodiment of the apparatus capable of bleaching two hundred tons per day of pulp, the vessel 10 could be constructed with the vessel upper portion 80 of around seven to nine foot diameter and the lower vessel portion 84 of around ten and one-half foot diameter, with an overall vessel height of about thirty feet. The gas flow through the vessel 10 could be approximately two thousand cubic feet per minute, the gas velocity through material in the vessel upper portion 80 being maintained around one-half to one foot per second and the gas exit velocity through the gas receiving chamber 88 being around eight-tenths of one foot per second. The pressure drop through the vessel 10 could, it is estimated, be about thirty-five inches of water, a value capable of being created by conventional centrifugal blowers. Scaling up or down of the apparatus to accommodate different tonnage requirements would preferably be performed by variance of the diameter of the vessel 10, while maintaining the height of the vessel 10 constant.

The operation of the apparatus is believed to be apparent from the beforegoing description. However, in order to insure understanding of the invention, a brief description of the operation of the apparatus for the ozone gaseous bleaching of pulp is hereinafter given.

Throughout such operation, the shaft 40 is continuously rotatably driven by its driving means (not shown) to provide continuous rotation of the feed-and-compacting screw 42. Also, the shaft 48 is rotatably driven by its driving means (not shown) to cause continuous rotation of the disintegrating screw 54, the annuli of rotary pins 56, 58 and the fan blades 66; and the scraper 70 is continuously rotatably driven by the driving motor 72. Pulp being bleached is retained in the vessel 10 for the period of time requisite for the bleaching operation in a porous pile or plug having its upper end generally as indicated by the reference numeral 102, while the pulp moves progressively downwardly as a porous plug, bleached pulp being discharged from the bottom of the porous plug through the conduit 68. The porous plug of pulp, thus maintained in the vessel 10, adjacent its upper end extends the full cross-section of the vessel upper portion 80 defined by the annular wall 82 and expands in cross-section in the vessel lower portion 84 to the full width thereof, whereby the porous pulp plug has the beforementioned, large, annular, interface 92 with gas in the gas receiving chamber 88. Dilution liquid is continuously supplied through the dilution liquid supply conduits 76 to the vessel lower portion 84; and the pulp in the latter is continuously moved towards the center of the vessel 10 by the scraper 70 prior to its discharge through the conduits 68.

Pulp to be bleached is continuously supplied through the inlet 32 of the feed-and-compacting means 28 to the rotatably driven screw 42 which compacts the pulp in the tapering conduit 38, thereby forming a non-porous plug of the pulp upstream of the vessel 10 to prevent the passage of undesirable gases to the vessel 10 through the conduit 38 and also prevent loss of reaction gas through the latter. The screw 54 of the disintegrating-and-blowing means 26 continuously receives this plug of pulp from the conduit 38 through the inlet 36 and breaks up or disintegrates the plug while simultaneously causing intermixing of the pulp with reaction gas discharged from the vessel 10 through the circulating gas conduit 64 and also feeding the pulp to the housing enlarged portion 44a and its contained pins 56, 58, 62. The pulp, intermixed with the gas, thence flows radially outwardly between the pins 56, 58, 62 whereby the latter further disintegrate and fluff the pulp to a condition suitable for gaseous bleaching and the formation in the vessel 10 of a porous pulp plug capable of allowing gas flow therethrough. The pulp then passes further radially outwardly past the fan vanes 66 and is blown through the outlet 46 and the therewith communcating conduit 24 and inlet 22 into the vessel upper portion 80.

The disintegrated material, thus introduced into the vessel upper portion 80, spreads across the cross-section of such portion 80 while simultaneously a mixture of ozone and oxygen (for example containing four percent ozone and ninety-six percent carrier oxygen) is continuously supplied at a controlled rate through the gas inlet 18 to the vessel upper portion 80. The spread, disintegrated pulp showers downwardly through the vessel upper portion 80 exposed to the introduced ozone/oxygen mixture for a short, but finite, time period (for example, five seconds) during which a large portion of the ozone is absorbed into the pulp due to the rapid absorption and reaction rate of the ozone. The pulp then falls onto the upper surface 102 of the porous pulp plug maintained in an intermediate area of the vessel upper portion 80, while the oxygen and remaining ozone flow downwardly through the pulp plug at a velocity which is greater than, and possibly as much as ten times more than, that of the plug. During this downward flow of gas through the intermediate area of vessel upper portion 80, the remaining, unabsorbed ozone is absorbed into the pulp. The porous plug form of the pulp at this location is believed to be extremely beneficial to the bleaching process as the downward gas flow produces an appreciable pressure drop (for example, as much as 35 inches of water), such pressure drop inherently tending to cause the gas to uniformly permeate the porous pulp plug and uniformly treat all of the pulp in the plug; and the pulp in plug form occupies a much smaller volume than in gaseous suspended form, enabling employment of a vessel of much smaller size than would be otherwise possible for a corresponding retention time. Adequate retention time is, of course, of great importance in the ozone bleaching process to insure complete absorption of the ozone and avoid incomplete absorption and resultant costly loss of ozone with the oxygen.

Adjacent the lower end of the vessel upper portion 80, the oxygen content of the supplied ozone/oxygen mixture exits upwardly through the interface 92 into the gas receiving chamber 88 from whence it is discharged through the gas discharge conduit 96. The supply of the gaseous mixture through the gas inlet 18, as beforedescribed, is maintained such that the velocity of the oxygen passing through the gas-pulp interface 92 is maintained below two feet per second and preferably in the range of one-half to one foot per second. Hence, the large oxygen carrier component of the supply gaseous mixture is readily, continuously discharged from the vessel 10 separately from the downwardly moving pulp.

The pulp continues to pass downwardly in the vessel 10 below the interface 92 in porous plug form; however, at such location there is no gas flow relative to the pulp. The pulp may be retained in the vessel lower portion 84 for any desired additional retention time to enable the reacting chemicals to continue to act upon the pulp even though the absorption of the chemicals from the gas phase into the pulp has already occurred. By way of specific example, in the ozone bleaching of ground-wood pulp a gas absorption of two minutes is normally employed followed by an additional retention of at least twenty minutes to enable completion of the chemical reaction prior to the dilution and discharge of the pulp which stop the reaction.

From the preceding description, it will be seen that the invention provides new and improved means for attaining all of the beforestated objects and advantages. It will be understood, however, that, although only a single embodiment of the invention has been illustrated and hereinbefore specifically described, the invention is not limited merely to this single embodiment, but rather contemplates other embodiments and variations within the scope of the following claims.

Having thus described my invention; I claim:

1. Apparatus for the gaseous reaction of material, comprising a generally vertical vessel, material supply means connected to the upper end of said vessel for supplying material thereto, gas supply means connected to the upper end of said vessel for supplying gas thereto and to material therein, means for discharging material from the lower end of said vessel, said vessel including an upper portion and a therebelow adjoining lower portion of cross-section greater than said upper portion, the juncture of said vessel portions being substantially spaced intermediate the ends of said vessel, the outer periphery of said vessel adjacent said juncture of said vessel portions being provided with gas discharge means open to said vessel lower portion for discharging gas therefrom, said gas discharge means including a gas receiving chamber extending along the outer periphery of said vessel and open to said vessel lower portion through an unrestricted opening to receive gas therefrom, said chamber being at least substantially closed from direct connection to said vessel upper portion, said gas discharge means further including gas outlet means connected to said chamber for discharging gas from said chamber and said chamber and said gas outlet means being free from screens and similar filtering media.

2. Apparatus according to claim 1, wherein said unrestricted opening is annular.

3. Apparatus according to claim 1, wherein said chamber is at least generally annular.

4. Apparatus according to claim 3, further comprising manifold means in said chamber below said gas outlet means for uniformly distributing gas in said chamber.

5. Apparatus for the gaseous reaction of material, comprising an elongated, generally vertical vessel, material supply means connected to the upper end of said vessel for supplying material to said upper end of said vessel, gas supply means connected to the upper end of said vessel for supplying a mixture of reactant gas and carrier gas to such upper end and to material therein, means for discharging material from the lower end of said vessel, said vessel including an upper portion and a therebelow adjoining, lower portion of cross-section greater than said upper portion, said vessel being provided with a gas receiving chamber extending around said vessel upper portion with its lower end substantially spaced intermediate the ends of said vessel and adjacent the juncture of said vessel portions, said lower end of said chamber being open to the upper end of said vessel lower portion through an unrestricted opening to upwardly receive carrier gas therefrom, wall means intermediate said gas receiving chamber and said vessel upper portion closing said gas receiving chamber from direct connection to said vessel upper portion, gas outlet means for discharging carrier gas from said gas receiving chamber, and said gas receiving chamber and said outlet means being free from screens and similar filtering media.

6. Apparatus according to claim 5, wherein said unrestricted opening is annular.

7. Apparatus according to claim 5, further comprising manifold means in said gas receiving chamber below said gas outlet means for uniformly distributing gas in said chamber.

8. Apparatus according to claim 5, wherein said gas receiving chamber is at least generally annular.

9. Apparatus according to claim 5, wherein said material supply means comprises means for compacting material and supplying material in compacted condition and means for disintegrating the compacted material to cause said supply means to spread disintegrated material in said vessel, and said gas supply means is arranged to supply gas to the disintegrated material during its spreading in said vessel.

10. Apparatus according to claim 5, wherein said material supply means comprises inlet means associated with said vessel, means for compacting material, and means interconnecting said inlet means and said material compacting means for disintegrating compacted material and causing the disintegrated material to be blown through said inlet means into said vessel, said disintegrating-and-blowing means including conduit means for discharging gas from said vessel whereby the discharged gas is recirculated to blow the disintegrated material into said vessel.

References Cited
UNITED STATES PATENTS

| | | | |
|---|---|---|---|
| 2,480,998 | 9/1949 | Brackett | 241—28 X |
| 2,587,020 | 2/1952 | Wicker et al. | 241—48 X |
| 3,692,246 | 9/1972 | Law et al. | 241—48 |
| 2,695,232 | 11/1954 | Richter | 162—237 |
| 3,076,610 | 2/1963 | Rosenfeld et al. | 241—28 |
| 3,327,952 | 6/1967 | Rosenfeld | 241—28 X |
| 3,503,846 | 3/1970 | Nardi | 162—236 |
| 3,693,380 | 9/1972 | Engstrom | 68—5 C |
| 3,703,435 | 11/1972 | Schleinoffer | 162—17 |
| 3,041,232 | 6/1962 | Richter et al. | 162—246 X |
| 2,803,540 | 8/1957 | Durant et al. | 162—236 |
| 3,434,920 | 3/1969 | Green | 162—237 |

S. LEON BASHORE, Primary Examiner

R. V. FISHER, Assistant Examiner

U.S. Cl. X.R.

68—5 C; 162—237, 246; 241—48